US009327579B2

(12) United States Patent
Eisenhour

(10) Patent No.: US 9,327,579 B2
(45) Date of Patent: May 3, 2016

(54) VEHICLE ENGINE WARM-UP APPARATUS

(75) Inventor: Ronald S. Eisenhour, West Bloomfield, MI (US)

(73) Assignee: Nissan North America, Inc., Franklin, TN (US)

(*) Notice: Subject to any disclaimer, the term of this patent is extended or adjusted under 35 U.S.C. 154(b) by 598 days.

(21) Appl. No.: 13/593,209

(22) Filed: Aug. 23, 2012

(65) Prior Publication Data
US 2014/0058651 A1 Feb. 27, 2014

(51) Int. Cl.
*G06F 19/00* (2011.01)
*G06G 7/70* (2006.01)
*F02G 5/00* (2006.01)
*B60H 1/00* (2006.01)
*F02D 41/06* (2006.01)
*F02M 35/10* (2006.01)
*F02M 31/13* (2006.01)

(52) U.S. Cl.
CPC .......... *B60H 1/00314* (2013.01); *F02D 41/068* (2013.01); *F02M 31/13* (2013.01); *F02M 35/1038* (2013.01); *F01P 2060/18* (2013.01); *F02D 2200/021* (2013.01); *F02D 2200/0414* (2013.01); *Y02T 10/126* (2013.01)

(58) Field of Classification Search
CPC ..... Y02T 10/126; F02M 31/13; F02M 31/042
USPC .............. 123/142.5, 543, 547, 549, 550, 552, 123/553, 556; 701/113
See application file for complete search history.

(56) References Cited

U.S. PATENT DOCUMENTS

| 2,320,528 | A | | 6/1943 | Loeffler et al. |
| 4,188,527 | A | * | 2/1980 | Follmer ................... B60H 1/03 219/202 |
| 4,944,260 | A | | 7/1990 | Shea et al. |
| 5,094,198 | A | * | 3/1992 | Trotta ..................... F02N 19/04 123/179.21 |
| 5,347,966 | A | | 9/1994 | Mahon et al. |
| 5,724,931 | A | * | 3/1998 | Hollis ...................... F01P 3/20 123/142.5 R |
| 6,010,076 | A | * | 1/2000 | Winik .................... B60H 1/034 123/142.5 R |
| 6,138,645 | A | | 10/2000 | Joppig et al. |
| 6,354,256 | B1 | | 3/2002 | Ohanian et al. |
| 6,964,269 | B2 | | 11/2005 | Gschwind et al. |
| 7,430,469 | B2 | * | 9/2008 | Kaita .................... B60K 6/445 123/516 |
| 7,472,695 | B2 | | 1/2009 | Prust et al. |
| 8,037,872 | B2 | | 10/2011 | Holler et al. |
| 2002/0073942 | A1 | * | 6/2002 | Hollis ...................... F01P 5/10 123/41.44 |

(Continued)

FOREIGN PATENT DOCUMENTS

GB 766303 A 1/1957

*Primary Examiner* — Sizo Vilakazi
(74) *Attorney, Agent, or Firm* — Global IP Counselors, LLP

(57) ABSTRACT

A vehicle engine warm-up apparatus includes a coolant temperature sensor, an intake temperature sensor, an air intake heater, a heating system and a controller. The intake temperature sensor measures a temperature of combustion air entering the engine. The coolant temperature sensor measures a temperature of engine coolant. The air intake heater is configured to heat the combustion air. The controller is operably coupled to the coolant temperature sensor, the intake temperature sensor and the air intake heater. The controller is configured to operate the air intake heater with the vehicle engine running to increase a rate of heating of the coolant by the engine to more rapidly make heat available to the heating system in response to determining that the air intake temperature is below a first temperature threshold and the coolant temperature is below a second temperature threshold.

20 Claims, 6 Drawing Sheets

(56) References Cited

U.S. PATENT DOCUMENTS

| | | | |
|---|---|---|---|
| 2006/0037564 A1* | 2/2006 | Hollis | F01P 5/12 123/41.1 |
| 2007/0084427 A1* | 4/2007 | Petrosius | F02D 41/06 123/142.5 E |
| 2011/0138774 A1* | 6/2011 | Pursifull | F01N 3/055 60/273 |
| 2012/0297765 A1* | 11/2012 | Vigild | F01P 3/20 60/599 |
| 2013/0197749 A1* | 8/2013 | Martini | F02D 41/021 701/36 |

* cited by examiner

VEHICLE ENGINE WARM-UP APPARATUS

BACKGROUND

1. Field of the Invention

The present invention generally relates to a warm-up apparatus for a vehicle engine. More specifically, the present invention relates to an apparatus for warming up a vehicle engine in order to more rapidly provide heat to the passenger compartment of the vehicle in cold weather conditions.

2. Background Information

A vehicle is typically includes a heating system that provides heat to a passenger compartment of the vehicle. The heating system includes a heat exchanger that is circulated with coolant from the engine. The engine coolant must first be warmed by the engine before heat can be provided to the passenger compartment. In cold weather conditions, it may take a considerable amount of time for the engine to heat the coolant. Passengers within the vehicle must therefore wait until the engine has at least partially warmed up before being provided with heat. Hence, passengers may have to wait an excessive amount of time to be provided with heat.

SUMMARY

In view of the state of the known technology, one object is to provide a vehicle engine with an apparatus that increases the rate at which the engine warms up in order to more rapidly provide heat within the passenger compartment.

In accordance with one aspect of the present invention, a vehicle engine warm-up apparatus includes a coolant temperature sensor, an intake temperature sensor, an air intake heater, a heating system and a controller. The coolant temperature sensor is configured to measure a temperature of coolant in a cooling system of a vehicle engine. The intake temperature sensor is configured to measure a temperature of combustion air entering the vehicle engine. The air intake heater is configured to heat the combustion air entering the vehicle engine. The heating system is configured to provide heat to a passenger compartment of a vehicle using heat transferred from the vehicle engine to the coolant. The controller is operably coupled to the coolant temperature sensor, the intake temperature sensor and the air intake heater. The controller is configured to operate the air intake heater with the vehicle engine running to increase a rate of heating of the coolant by the vehicle engine to more rapidly make heat available to the vehicle heating system in response to determining that the air intake temperature is below a first temperature threshold and the coolant temperature is below a second temperature threshold.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
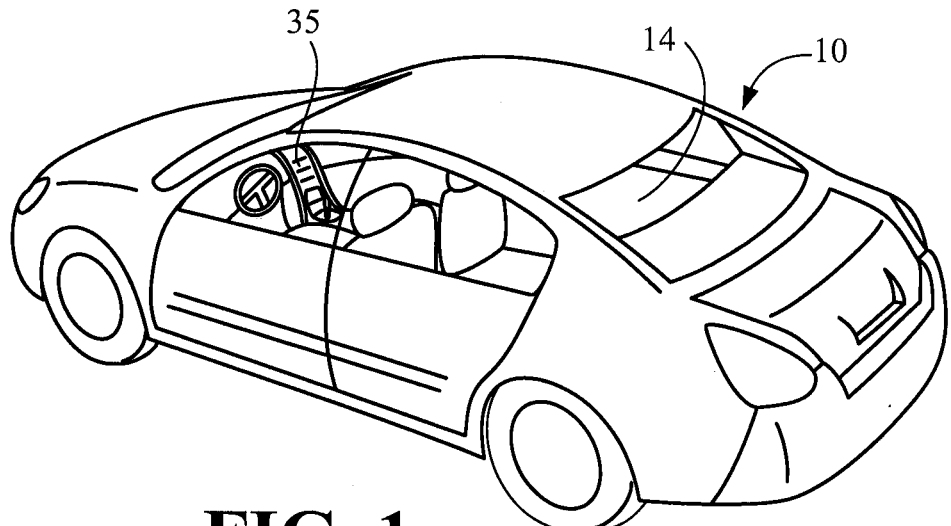
FIG. 1 is a perspective view of a vehicle that includes an engine, a heating system and a vehicle engine warm-up apparatus in accordance with the various embodiments.
Figure 2:
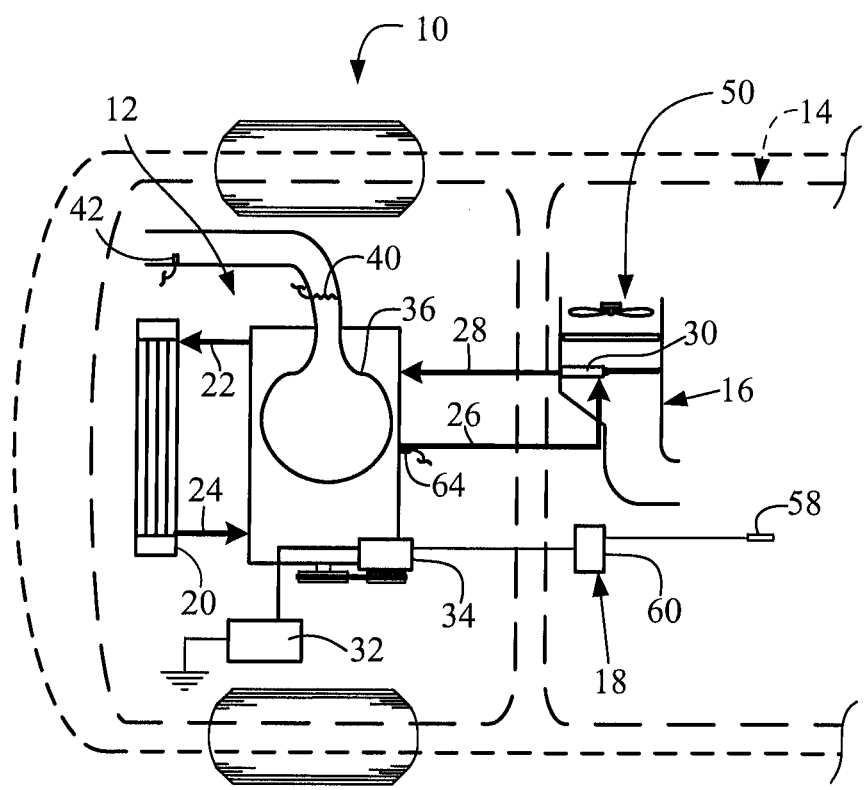
FIG. 2 is a schematic view of the engine, the heating system and the vehicle engine warm-up apparatus in accordance with the various embodiments.

Referring initially to FIGS. 1 and 2, a vehicle 10 is illustrated in accordance with a first embodiment. The vehicle 10 includes an engine 12, a passenger compartment 14, a heating system 16 and an engine warm-up apparatus 18. The vehicle 10 also includes a variety of additional features and components that are omitted from this description for the sake of brevity.

The engine warm-up apparatus 18 is described in greater detail below, after a description of invention related features of the engine 12, the passenger compartment 14 and the heating system 14.

The engine 12 is installed within an engine compartment of the vehicle 10, as shown in FIG. 2. The engine 12 can be any of a variety of hydrocarbon fueled engines, such as a gasoline powered internal combustion engine, a natural gas powered engine, or a diesel engine. Alternatively, the engine 12 can be a hybrid engine with the combination of an electric motor and a hydrocarbon fueled engine. The engine 12 includes, among other elements, a cooling system having a radiator 20 for dissipating excess heat, coolant hoses 22, 24, 26 and 28, and a heater core 30 that is also a part of the heating system 14 of the vehicle 10.

As shown in FIG. 2, the coolant hoses 22 and 24 connect the radiator 20 with the engine 12 such that coolant can selectively circulate between the engine 12 and the radiator 20. The coolant hoses 26 and 28 connect the heater core 30 to the engine 12 such that coolant can selectively circulate between the engine 12 and the heater core 30. It should be understood from the drawings and the description herein that the engine 12 includes a thermostat or other coolant flow restricting device such that coolant flow between the engine 12 and the radiator 20 is controlled. Specifically, the thermostat (not shown) prevents the flow of coolant between the engine 12 and the radiator 20 when the engine 12 is cold (when the engine 12 is below a predetermined operating temperature).

It should also be understood from the drawings and the description herein that the engine 12 and/or heating system 16 can include a heater valve (not shown) that can control the flow of coolant circulating between the engine 12 and the heater core 30. However, such a heater valve is not required for practicing the invention, as is apparent from the description below.

The engine 12 also includes a battery 32, an alternator 34 and an air intake assembly 36. The battery 32 is provided for starting the engine 12 and providing backup electric power to the vehicle 10, in a conventional manner. The battery 32 is supplied with electricity (for recharging) by the alternator 34. The alternator 34 is further configured to supply most if not all of the electric power necessary to run all electric powered equipment within the vehicle 10, when the engine 12 is running.

The air intake assembly 36 can have any of a variety of differing configurations and functions. For example, in some engine configurations the air intake assembly 36 can have a simple configuration in which air is directed through an air filter prior to the air entering the engine 12 for combustion. In other engine configurations, the air intake assembly 36 can include, for example, an air flow metering device used in combination with a fuel injection system. Specifically, the air intake assembly 36 is not limited to any one configuration or function. For the purposes of the invention described herein, the only required function of the air intake assembly 36 is to direct air into the engine 12 for combustion with a hydrocarbon fuel or other manufactured or processed fuel that requires air for combustion.

The air intake assembly 36 is provided with two features that are part of the engine warm-up apparatus 18. Specifically, the air intake assembly 36 is provided with an air intake heater 40 and an air intake temperature sensor 42 whose purpose and function are described in greater detail below with respect to the engine warm-up apparatus 18.

The passenger compartment 14 includes many conventional elements, such as an instrument panel, seats and driving controls, whose description is omitted for the sake of brevity. The instrument panel includes a control panel 35 that is operated by a passenger within the vehicle 10 to control operation of the heating system 16, as is described in greater detail below.

The heating system 16 of the vehicle 10 includes an air handler 50. The air handler 50 is shown schematically in FIG. 3 along with an optional air conditioning evaporator 52, an air diverter door 54, a blower 56, an air temperature sensor 58, the control panel 35 and the heater core 30. The heating system 16 is configured to provide heat to the passenger compartment 14 of the vehicle 12 using heat transferred from the engine 12 to the coolant circulating through the engine 12.

Figure 3:
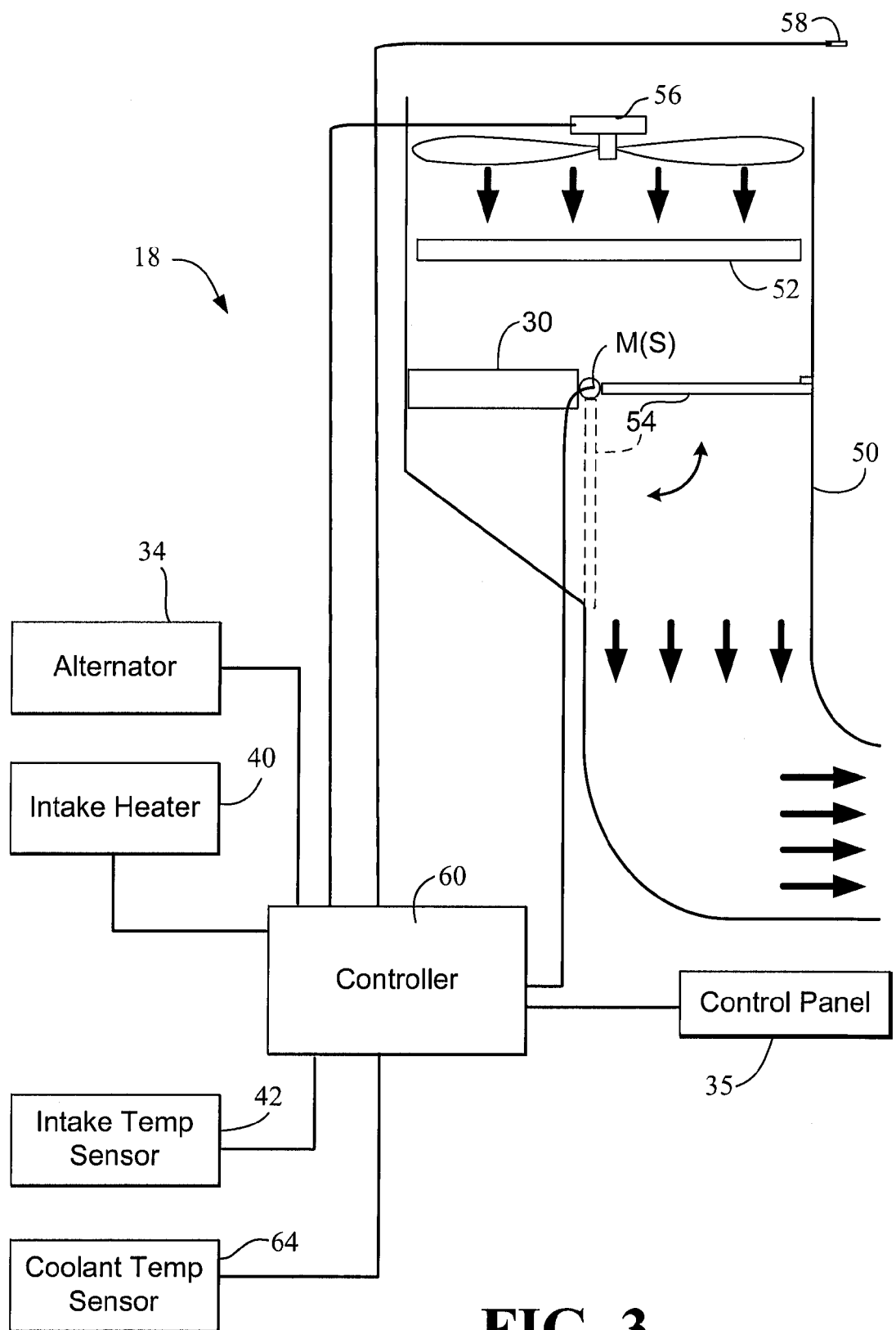
FIG. 3 is a schematic view of the heating system and the vehicle engine warm-up apparatus in accordance with the various embodiments.

The arrangement shown in FIG. 3 is a functional depiction that shows the various elements that are installed within the air handler 50. For example, the air conditioning evaporator 52, the air diverter door 54, the blower 56 and the heater core 30 are all disposed within the air handler 50. However, the relative positions of the various elements within the air handler 50 can be changed and/or re-arranged for the specific design of the vehicle 10, and is not limited to the schematic depiction in FIG. 3.

The air handler 50 is basically an air duct or a series of air ducts that directs air from outside the vehicle 12 (in a fresh air mode) and/or recirculates air from within the passenger compartment 14 (in a recirculation mode) back into the air handler 50 in a conventional manner. Since the basic operations of an air handler 50 are conventional, further description is omitted for the sake of brevity.

The air conditioning evaporator 52 is an optional feature of the air handler 50. Most vehicles include a conventional air conditioning (AC) system. However such an AC system is not required in all vehicles. Since air conditioning systems are conventional, further description of the air conditioning evaporator 52 is omitted for the sake of brevity.

The air diverter door 54 is a hinged member that is movable between a heat enabled position (shown in solid lines in FIG. 3) and a heat disabled position (shown in dashed lines in FIG. 3). More specifically, the air diverter door 54 is movable between the heat enabled position and the heat disabled position in order to control the amount of heat added to air flowing through the air handler 50. For example, when the air diverter door 54 is in the heat enabled position, all air passing through the air handler 50 passes along heat transferring surfaces of the heater core 30. If heat is available from coolant circulating through the heater core 30, the air flowing through the heater core 30 is heated. When the air diverter door is in the heat disabled position, the air passing through the air handler 50 is prevented from passing along heat transferring surfaces of the heater core 30.

In the depicted embodiment, the air diverter door 54 includes a motor M and a position sensor S. The motor M can be a vacuum controlled positioning device, or an electric motor. The sensor S provides feedback to a controller 60 (described further below) such that the controller 60 controls the position of the air diverter door 54. Both the motor M and the positioning sensor S are connected to the controller 60, as is described in greater detail below. Alternatively, the motor M can be replaced with a conventional cable connected to the air diverter door 54. The cable (not shown) is also connected to a control mechanism included in the control panel 35. When the control mechanism, such as a lever, is manipulated by the passenger, the amount of air flowing across heat transfer surfaces of the heater core 30 is adjusted in a conventional manner. The positioning sensor S can be included in the embodiment with the cable in order to sense the position of the air diverter door 54.

The blower 56 is provided to force air through the air handler 50. A speed of the blower 56 is controlled by the settings on the control panel 35 within the passenger compartment 14. Since the blower 56 is a conventional element, further description is omitted for the sake of brevity.

The air temperature sensor 58 is positioned within the passenger compartment 14 and is connected to the controller 60. The function of the air temperature sensor 58 is described further herein below.

The control panel 35 includes control elements that allow the passenger within the passenger compartment 14 to control operation of the heating system 16 and the AC system. The control panel 35 is connected to the controller 60, and is manipulated by the passenger(s) to control operation of AC system, the air diverter door 54 and the blower 56.

A description of the engine warm-up apparatus 18 is now provided with specific reference to FIG. 3. The engine warm-up apparatus 18 basically includes the air intake heater 40, the air intake temperature sensor 42, the air temperature sensor 58, the controller 60 and a coolant temperature sensor 64. The air intake heater 40, the air intake temperature sensor 42, the air temperature sensor 58 and the coolant temperature sensor 64 are all connected to the controller 60.

The coolant temperature sensor 64 can be located in any of a variety of locations. For example, the coolant temperature sensor 64 can be on or within the engine 12 to measure the temperature of the coolant circulating through the engine 12. Alternatively, the coolant temperature sensor 64 can be located within the heater core 30 or one of the coolant hoses 26 and 28, as shown in FIG. 2. With respect to the invention, the coolant temperature sensor 64 measures coolant temperature $T_C$ of the coolant that provides heat to the heater core 30 and hence provides heat to the passenger compartment 14, once excess heat from the engine 12 is available. The coolant temperature sensor 64 is connected to the controller 60 providing signals that represent the temperature of the coolant circulating through the engine 12 and heater core 30.

The air intake temperature sensor 42 is configured to measure an air intake temperature $T_A$ of the combustion air entering the engine 12. The air intake heater 40 is configured to heat the combustion air entering the engine 12. The air intake heater 40 is, for example, an electric heater that draws most of not all of its electricity from the alternator 34, not the battery 32. More specifically, the air intake heater 40 is operated by the controller 60 only when the engine 12 is running and the alternator 34 is producing electric current. The controller 60 does not operate the air intake heater 40 when the controller 60 detects that the engine 12 is not running.

In a first embodiment, the controller 60 is operably coupled to at least the coolant temperature sensor 64, the intake temperature sensor 42 and the air intake heater 40 to operate the air intake heater 40 with the vehicle engine running to increase a rate of heating of the coolant by the engine 12. The increasing of the rate of heating of the coolant is to more rapidly make heat available to the heating system 16. The controlling of the air intake heater 40 by the controller 60 is in response to determining that the air intake temperature $T_A$ is not above a first temperature threshold $T_1$. The controlling of the air intake heater 40 is also in response to determining that the coolant temperature $T_C$ is below a second temperature threshold $T_2$. The controller 60 is further configured to cease operation of the air intake heater 40 in response to determining the air intake temperature $T_A$ is above the first temperature threshold $T_1$. The controller 60 is further configured to cease operation of the air intake heater 40 in response to determining that the coolant temperatures $T_C$ is above an upper threshold $T_U$. The controller 60 is further configured to cease operation of the air intake heater in response to determining the coolant temperature $T_C$ is not below the second temperature threshold $T_2$. The first temperature threshold $T_1$, the second temperature threshold $T_2$ and the upper threshold $T_U$ are predetermined and are saved values within memory of the controller 60.

The controller 60 is also connected to the alternator 34 to detect whether or not the alternator 34 is generating electric current. More specifically, the controller 60 is configured to detect whether or not the engine 60 is running.

In circumstances where the vehicle 10 is exposed to cold weather conditions, the temperature of the engine 12 can get correspondingly low along with the coolant within the engine 12 and the heating system 16. When the engine 12 is started in cold weather conditions, the engine 12 can take a considerable amount of time to reach operating temperatures (for example, somewhere between about 150° F. and 200° F., or 66° C. and 93° C.). In conditions where the ambient temperature is below 10° C., a small fuel efficient engine can take anywhere from, for example, 10 minutes to 15 minutes to reach operation temperatures (the actual time differs from engine to engine). In most vehicles, heat is not available to the heating system 16 until the engine 12 has approached or achieved the operation temperature. Therefore, passengers within the passenger compartment 14 are without heat for a considerable amount of time.

When an engine is initially started, the combustible air is compressed, thereby raising the temperature of the combustible air. For example, at −20° C., the compressing power of the engine 12 increases the temperature of the compressed combustible air to about 350° C. (with a compression ratio of about 9.5). However, a significant portion of the heat generated by the compression process of the engine 12 is expelled with exhaust gases.

The inventor notes the following: by heating the combustion air as it enters the engine 12 for the combustion process, it is possible to generate an increased about of heat within the engine 12, thereby heating the coolant circulating within the engine more rapidly than in an engine where the combustion air is not pre-heated. The inventor has compiled the following temperature related information for an engine with a 9.5 compression ratio:

TABLE 1

| AIR INTAKE TEMPERATURE ° C. | COMPRESSED AIR TEMPERATURE ° C. |
| --- | --- |
| −20 | 350 |
| −10 | 374 |
| 0 | 399 |
| 10 | 424 |
| 20 | 448 |
| 30 | 473 |

As can be observed by the above TABLE 1, if the air entering the air intake assembly 36 has an air intake temperature $T_A$ equal to −20° C., then upon compression (prior to ignition) that air only reaches 350° C. However, if that same cold air is heated to 0° C., then upon compression, that air now reaches 399° C. If that same cold air is heated to 30° C., then upon compression that air now reaches 473° C. Thus, a heating of the combustion air entering the engine 12 can generate a significant temperature potential to move heat to a cold engine as a result of the compression process of the engine 12. Hence, the inventor has developed the system and processes further described below to take advantage of the compression work of the engine 12. By heating the combustion air just prior to that air entering the engine 12, the engine 12 more rapidly reaches operation temperature and more rapidly produces heat that can be used to heat the passenger compartment 14.

Figure 4:
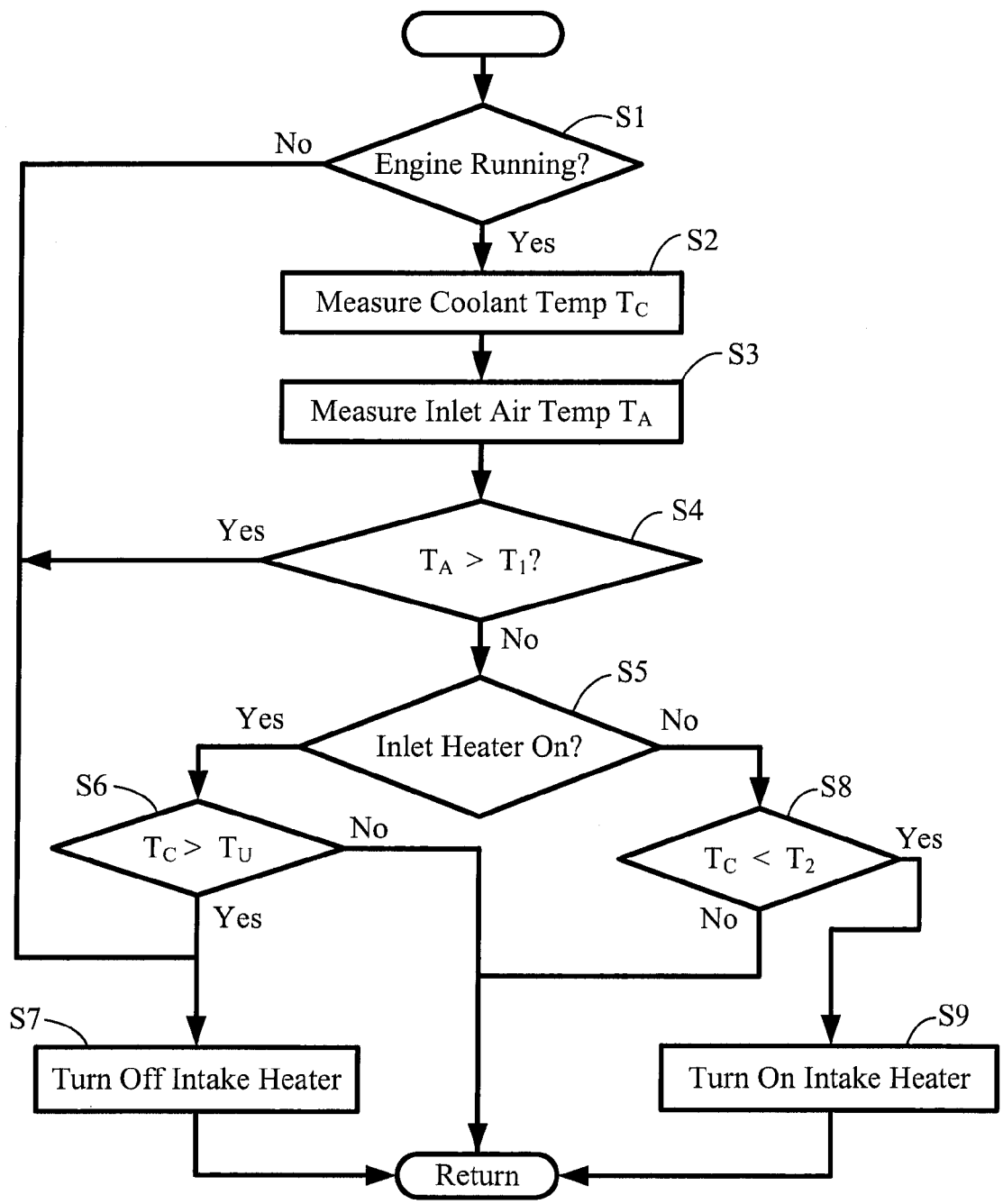
FIG. 4 is a flowchart showing steps of operation of the vehicle engine warm-up apparatus in accordance with a first embodiment.

A first embodiment is described now with specific reference to FIG. 4.

In the flowchart depicted in FIG. 4, step S1 represents the controller 60 checking to see whether or not the engine 12 is running, and optionally, running smoothly. Step S1 can be accomplished in any of a variety of manners. For example, the controller 60 can be connected to the alternator 34 and can detect that the engine 12 is running by determining whether or not the alternator 34 is producing electric current. It should also be understood from the description and drawings herein, that the controller 60 can also be connected to ignition circuitry (not shown) of the engine 12 in order to determine whether or not the engine 12 is running and whether or not the engine 12 is running smoothly. The engine speed can be detected by the controller 60 to determine if the engine is running.

The engine warm-up apparatus 18 is not necessarily conceived to aid in the performance of the engine 12 (although it could be), but is conceived to more rapidly warm-up the engine 12 in order to provide heat to the passenger compartment 14 more quickly. Therefore, in the depicted embodiment, the controller 60 engages the air intake heater 40 in response to determining that the engine 12 has been started and is idling or running smoothly. The vehicle 10 includes other elements and features (not shown) that effect the starting and smooth running of the engine 12.

In step S1, if the engine is running (and running smoothly) then operation moves to step S2. If the engine is not running (or is not running smoothly) then operation moves to step S7 (described below). At step S2, the controller 60 checks the signals received from the coolant temperature sensor 64 in order to determine the coolant temperature $T_C$. Next, at step S3, the controller 60 checks the signals received from the air intake temperature sensor 42 in order to determine the air intake temperature $T_A$. Next, at step S4, a comparison is made by the controller 60. Specifically, the controller 60 determines whether or not the air intake temperature $T_A$ is greater than the first temperature threshold $T_1$. If $T_A$ is greater than $T_1$ then operation moves again to step S7 (described below). If $T_A$ is greater than $T_1$ it means that, with the engine 12 running, the inlet air temperature $T_A$ does not need to be heated or little advantage is gained by heating the combustion air because of its current temperature.

The first temperature threshold $T_1$ is not a fixed value for all vehicles. The first temperature threshold $T_1$ is predetermined on a vehicle-by-vehicle basis, depending upon the actual compression ratio of the engine and the anticipated time to warm-up the engine 12 without activating the engine warm-up apparatus 18. In the depicted embodiment, with a consideration of the data tabulated in TABLE 1 above, the first temperature threshold $T_1$ is set and stored in memory as being about 10° C.

At step S4, if $T_A$ is not greater than $T_1$ then operation moves to step S5. At step S5, the controller 60 determines whether or not the air intake heater 40 is on and is heating the air passing through the air intake assembly 36. At step S5, if air intake heater 40 is on, operation moves to step S6. If air intake heater 40 is not on, operation moves to step S8 (described below).

At step S6, another comparison is made by the controller 60. Specifically, the controller 60 determines whether or not the coolant temperature $T_C$ is greater than the upper threshold $T_U$.

The upper threshold $T_U$ is another variable that is predetermined on a vehicle-by-vehicle basis or engine-by-engine basis. The upper threshold $T_U$ is typically a value that is less than or equal to the operating temperature of the engine 12. In the depicted embodiment, the upper threshold $T_U$ is equal to 85° C. If $T_C$ is greater than $T_U$ it means that the engine 12 coolant is heated sufficiently to provide heat to the heater core 30 and hence provide adequate heat to the passenger compartment 14.

At step S6, if $T_C$ is greater than $T_U$ then operation moves to step S7 where the air intake heater 40 is dis-engaged or turned off. At step S6, if $T_C$ is not greater than $T_U$ then operation returns to the beginning of the flowchart and repeats the operations set forth in FIG. 4. After step S7, operations return to the beginning of the flowchart and the steps repeat.

Attention now returns to the negative decision made at step S5, where operation moves to step S8. At step S8, another comparison is made by the controller 60. Specifically, the controller 60 determines whether or not the coolant temperature $T_C$ is less than the second temperature threshold $T_2$.

The second temperature threshold $T_2$ is a value that can be equal to the upper threshold $T_U$ but is preferably less that the upper threshold $T_U$. In the depicted embodiment, the second temperature threshold $T_2$ is equal to 80° C. Specifically, if the coolant temperature $T_C$ is close to the operating temperature of the engine 12, then there may be little advantage to engaging the air intake heater 40. However, if the coolant temperature $T_C$ is well below the operating temperature of the engine 12, then there may be an advantage to engaging the air intake heater 40.

Therefore, at step S8, if the controller 60 determines that the coolant temperature $T_C$ is less than the second temperature threshold $T_2$, operation moves to step S9. At step S9, the air intake heater 40 is turned on, thereby heating the combustion air within the air intake assembly 36 as that air enters the engine 12 for combustion. At step S8, if the controller 60 determines that the coolant temperature $T_C$ is not less than the second temperature threshold $T_2$, operation returns to the beginning of the flowchart and repeats.

Hence, in the steps set forth in the flowchart of FIG. 4, there is a method for warming-up a vehicle engine. The method includes measuring temperature of combustion air entering the engine 12 and measuring temperature of coolant within a cooling system of the engine 12 and determining the relationships between these measured temperatures and predetermined values. If these temperatures fall within the predetermined values, the air intake heater 40 can be operated. Thereafter, the air intake heater 40, with the vehicle engine running, heats the combustion air entering the engine 12 to increase a rate of heating of the coolant within the engine 12 in order to more rapidly make heat available to the heating system 16 of the passenger compartment 14. The operating of the air intake heater 40 is in response to determining that the inlet air temperature is below a first temperature threshold $T_1$ and the coolant temperature $T_C$ is below the second temperature threshold $T_2$.

The method shown in FIG. 4 further includes ceasing operation of the air intake heater 40 in response to determining the coolant temperature $T_C$ is above the upper threshold $T_U$. The method shown in FIG. 4 further includes ceasing operation of the air intake heater 40 in response to determining the air intake temperature $T_A$ is not below the second temperature threshold $T_2$.

Second Embodiment

Figure 5:
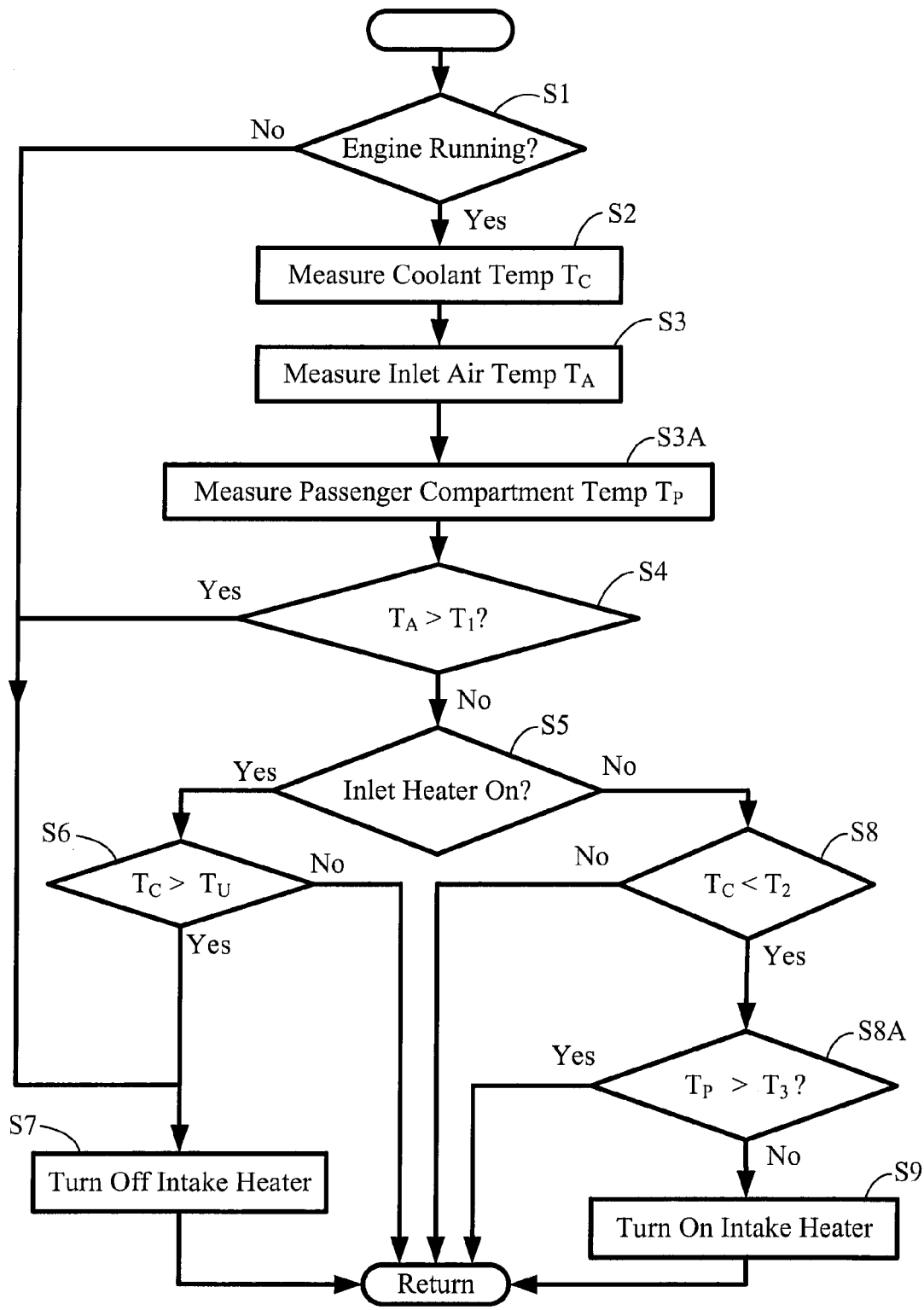
FIG. 5 is a flowchart showing steps of operation of the vehicle engine warm-up apparatus in accordance with a second embodiment.

Referring now to FIG. 5, a flowchart showing steps of operating the engine warm-up apparatus 18 in accordance with a second embodiment will now be explained. In view of the similarity between the first and second embodiments, the operation (steps) of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The second embodiment depicted in the flowchart in FIG. 5 includes all of the steps S1 through S9 as described above in the first embodiment and all of the elements described and shown in FIGS. 2 and 3. However, in the second embodiment, two additional steps have been added, steps S3A and S8A. Specifically, after step S3, a new step S3A has been added in which a passenger compartment temperature $T_P$ is measured by the air temperature sensor 58. In FIG. 2, the air temperature sensor 58 is shown being within the passenger compartment 14 adjacent to the air handler 50. However, it should be understood that the air temperature sensor 58 can be located at a variety of locations within the passenger compartment 14 or the air handler 50.

The usefulness of the air temperature sensor 58 is apparent when one considers the following circumstances. Specifically, if the vehicle 10 has been left out in cold weather conditions, but is also left out in the sun, the passenger compartment 14 may be well heated by the sun. If the passenger compartment 14 is above a predetermined third threshold temperature $T_3$, it may not be necessary to increase the rate at which the engine 12 warms up.

Therefore, at step S3A, the controller 60 determines the passenger compartment temperature $T_P$ based upon signals received from the air temperature sensor 58. The controller 60 then moves operation to step S4 (described above with respect to FIG. 4).

In the second embodiment, after step S8, operation moves to a new step S8A, where another comparison is made. Specifically, in step S8A, the controller 60 determines whether or not the passenger compartment temperature $T_P$ is greater than the third temperature threshold $T_3$. The third temperature threshold $T_3$ is a value based upon passenger comfort and in the depicted embodiment is equal to about 25° C. It is assumed that the temperature within the passenger compartment 14 will begin to drop once the vehicle 10 is in motion and before the heating system 16 is able to provide heat to the passenger compartment 14. Therefore, the third temperature threshold $T_3$ is set to the above mentioned value and stored in the memory of the controller 60.

At step S8A, if $T_P$ is greater than $T_3$, then operation returns to the beginning of the flowchart depicted in FIG. 5. If $T_P$ is not greater than $T_3$, then operation moves to step S9, where the air intake heater 40 is turned on.

Other than the addition of step S3A and step S8A, the steps S1 through S9 are the same as described above, except that after step S3 operation moves to step S3A, and after a positive determination in step S8, operation moves to the new step S8A.

Third Embodiment

Figure 6:
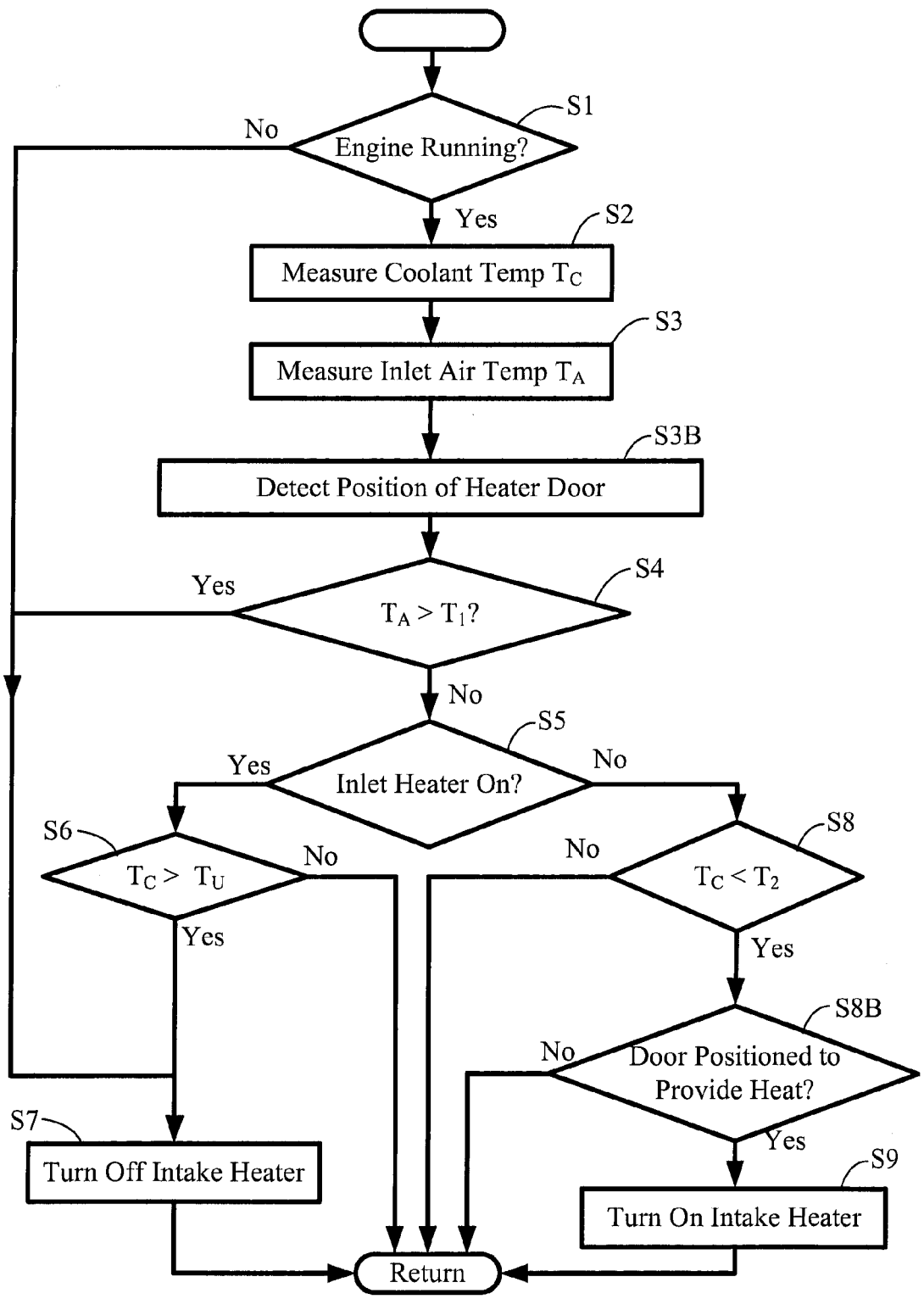
FIG. 6 is a flowchart showing steps of operation of the vehicle engine warm-up apparatus in accordance with a third embodiment.

Referring now to FIG. 6, a flowchart showing steps of operating the engine warm-up apparatus 18 in accordance with a third embodiment will now be explained. In view of the similarity between the first and third embodiments, the operation (steps) of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The third embodiment depicted in the flowchart in FIG. 6 includes all of the steps S1 through S9 as described above in the first embodiment and all of the elements described and shown in FIGS. 2 and 3. However, in the third embodiment, two additional steps have been added, steps S3B and S8B. Specifically, after step S3, a new step S3B has been added in which the position of the air diverter door 54 (aka heater door) is sensed by the sensor S. The position of the air diverter door 54 demonstrates the status of the heating system 16. Specifically, if the air diverter door 54 is in the heat enabled position then the controller 60 determines that heat is being requested by the passenger(s) within the vehicle 10. If the air diverter door 54 is in the heat disabled position, then the controller 60 determines that heat is not being requested by the passenger(s) within the vehicle 10.

Therefore, at step S3B, the controller 60 determines the position of the air diverter door 54 based upon signals from the sensor S and consequently, determines the status of the heating system. The controller 60 then moves operation to step S4 (described above with respect to FIG. 4).

In the third embodiment, after step S8, operation moves to a new step S8B, where another comparison is made. Specifically, in step S8B, the controller 60 determines whether or not the passenger(s) have requested heat, based upon the position of the air diverter door 54. The position of the air diverter door 54 corresponding to requested heat determination can be, for example, a range of positions and is not limited to the full heat position depicted in solid lines in FIG. 3.

At step S8B, if heat has not been requested, then operation returns to the beginning of the flowchart depicted in FIG. 5. If heat has been requested at step S8B, then operation moves to step S9, where the air intake heater 40 is turned on.

Other than the addition of step S3B and step S8B, the steps S1 through S9 are the same as described above, except that after step S3 operation moves to step S3B, and after a positive determination in step S8, operation moves to the new step S8B.

Fourth Embodiment

Figure 7:
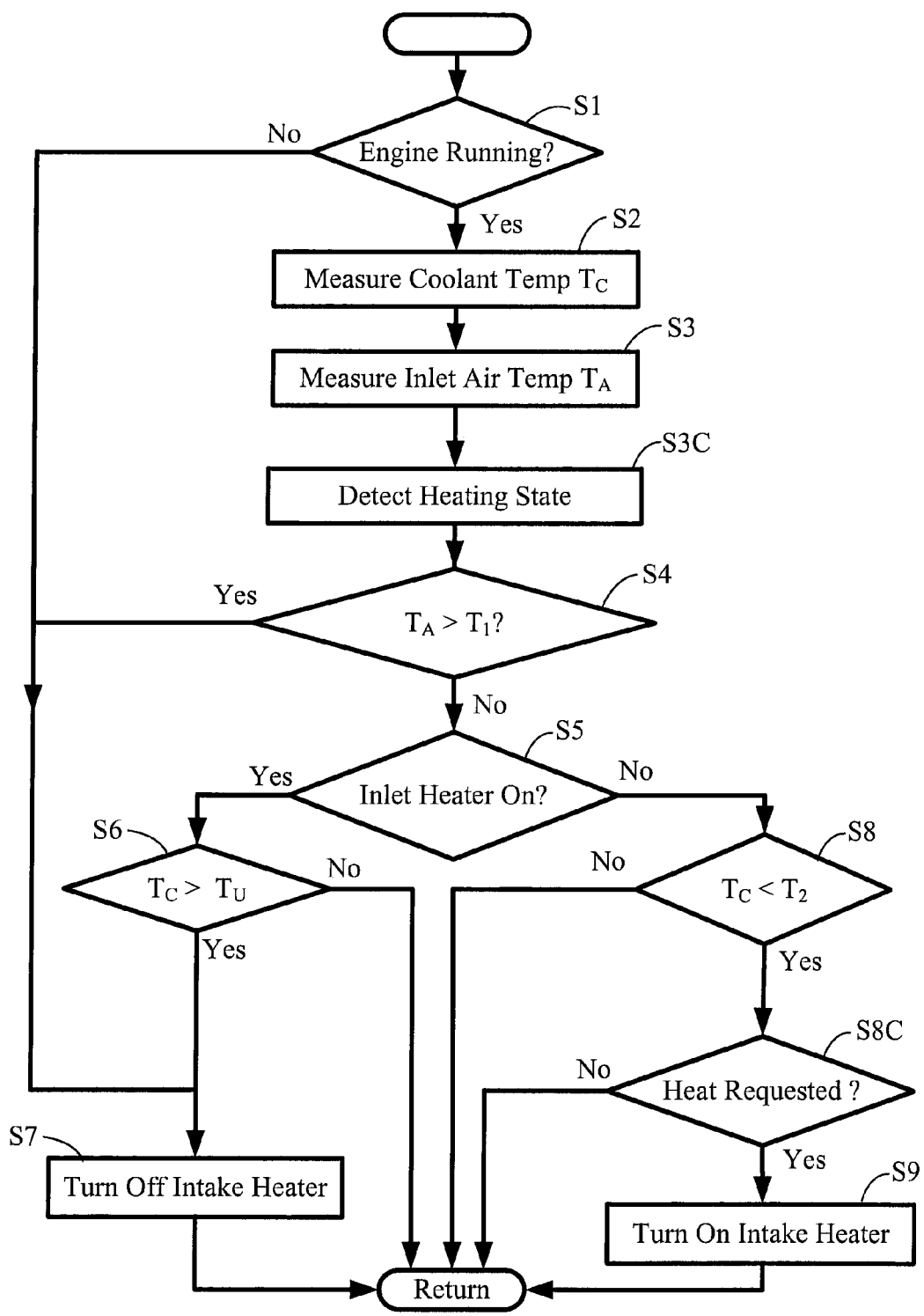
FIG. 7 is a flowchart showing steps of operation of the vehicle engine warm-up apparatus in accordance with a fourth embodiment.

Referring now to FIG. 7, a flowchart showing steps of operating the engine warm-up apparatus 18 in accordance with a fourth embodiment will now be explained. In view of the similarity between the first and fourth embodiments, the operation (steps) of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The fourth embodiment depicted in the flowchart in FIG. 7 includes all of the steps S1 through S9 as described above in the first embodiment and all of the elements described and shown in FIGS. 2 and 3. However, in the fourth embodiment, two additional steps have been added, steps S3C and S8C. Specifically, after step S3, a new step S3C has been added in which the status of the control panel 35 is detected by the controller 60. Specifically, if the settings on the control panel 35 are such that heat is being requested, such settings demonstrate the status of the heating system 16.

Therefore, at step S3C, the controller 60 determines the status of the heating system based upon signals from the control panel 35 that provide an indication of the settings of the control panel 35 made by vehicle occupants. The controller 60 then moves operation to step S4 (described above with respect to FIG. 4).

In the fourth embodiment, after step S8, operation moves to a new step S8C, where another comparison is made. Specifically, in step S8C, the controller 60 determines whether or not the passenger(s) have requested heat, based upon the settings of the control panel 35 within the passenger compartment 14.

At step S8C, if heat is not been requested, then operation returns to the beginning of the flowchart depicted in FIG. 5. If heat has been requested at step S8C, then operation moves to step S9, where the air intake heater 40 is turned on.

Other than the addition of step S3C and step S8C, the steps S1 through S9 are the same as described above, except that after step S3 operation moves to step S3C, and after a positive determination in step S8, operation moves to the new step S8C.

The controller 60 preferably includes a microcomputer (having a central processing unit or CPU) with an engine warm-up control program that controls the engine warm-up apparatus 18. The controller 60 can also include other conventional components such as an input interface circuit, an output interface circuit, and storage devices such as a ROM (Read Only Memory) device and a RAM (Random Access Memory) device. The microcomputer of the controller 60 is programmed to control the engine warm-up apparatus 18. The memory circuit stores processing results and control programs such as ones for operation of the engine warm-up apparatus 18 that are run by the processor circuit. The controller 60 is operatively coupled to the various components and elements of the engine warm-up apparatus 18 in a conventional manner. The internal RAM of the controller 60 stores statuses of operational flags and various control data. The internal ROM of the controller 60 stores the predetermined data values, such as the temperature thresholds, for various operations. It will be apparent to those skilled in the art from this disclosure that the precise structure and algorithms for the controller 60 can be any combination of hardware and software that will carry out the functions of the present invention.

The various elements of the vehicle 10, such as engine control components (not shown) are conventional components that are well known in the art. Since these components are well known in the art, these structures will not be discussed or illustrated in detail herein.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention should be interpreted relative to a vehicle equipped with the vehicle engine warm-up apparatus.

The term "detect" as used herein to describe an operation or function carried out by the controller 60, or a component, a section, a device or the like includes a component, a section, a device or the like that does not require physical detection, but rather includes determining, measuring, modeling, predicting or computing or the like to carry out the operation or function whereby one or more parameters measured or sensed by one of the sensors connected to the controller 60 in received processed accordingly by the controller 60.

The term "configured" as used herein to describe a component, section or part of a device that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle engine warm-up apparatus comprising:
    a coolant temperature sensor configured to measure a temperature of coolant in a cooling system of a vehicle engine;
    an intake temperature sensor configured to measure a temperature of combustion air entering the vehicle engine;
    an air intake heater configured to heat the combustion air entering the vehicle engine;
    a heating system configured to provide heat to a passenger compartment of a vehicle using heat transferred from the vehicle engine to the coolant; and
    a controller operably coupled to the coolant temperature sensor, the intake temperature sensor and the air intake heater, the controller being configured to operate the air intake heater with the vehicle engine running to increase a rate of heating of the coolant by the vehicle engine to more rapidly make heat available to the heating system in response to determining that the air intake temperature is below a first temperature threshold and the coolant temperature is below a second temperature threshold.

2. The vehicle engine warm-up apparatus according to claim 1, wherein
    the controller is further configured to cease operation of the air intake heater in response to determining the coolant temperature is above the first temperature threshold.

3. The vehicle engine warm-up apparatus according to claim 1, wherein
    the controller is further configured to cease operation of the air intake heater in response to determining the air intake temperature is above the second temperature threshold.

4. The vehicle engine warm-up apparatus according to claim 1, further comprising
    a passenger compartment temperature sensor, with the controller being further configured to operate the air intake heater in response to determining that the temperature within the passenger compartment measured by the passenger compartment temperature sensor is below a third threshold temperature.

5. The vehicle engine warm-up apparatus according to claim 4, wherein
    the controller is further configured to prevent operation of the air intake heater in response to determining that the passenger compartment is above the third threshold temperature.

6. The vehicle engine warm-up apparatus according to claim 1, further comprising
    a heating system sensor configured to sense an operational state of the vehicle heating system, where the heating system operates in a heat requested operating state and a no-heat requested operating state, and
    the controller being further configured to operate the intake heater in response to determining that the vehicle heating system is in the heat requested operating state.

7. The vehicle engine warm-up apparatus according to claim 6, wherein
    the controller is further configured to cease operation of the air intake heater in response to determining that the vehicle heating system is in the no-heat requested operating state.

8. The vehicle engine warm-up apparatus according to claim 6, wherein
    the heat system sensor is coupled to a heater core door, the door being movable by passenger operated controls to move between a first position corresponding to the heat requested operating state such that the heater core door allows heating of air flowing to the passenger compartment and a second position corresponding to the no-heat requested operating state such that the heater core door prevents heating of air flowing to the passenger compartment.

9. The vehicle engine warm-up apparatus according to claim 1, further comprising
a passenger compartment temperature sensor, and
heating system controls including a thermostatic device operable by a vehicle passenger, with the controller being further configured operated the air intake heater in response to determining that the temperature within the passenger compartment measured by the passenger compartment temperature sensor is below a temperature setting of the thermostatic device.

10. The vehicle engine warm-up apparatus according to claim 9, wherein
the controller is further configured to cease operation of the air intake heater in response to determining that the temperature within the passenger compartment measured by the passenger compartment temperature sensor is at or above the temperature setting of the thermostatic device.

11. A method for warming-up a vehicle engine, comprising
measuring a temperature of coolant within a cooling system of a vehicle engine;
measuring a temperature of combustion air entering the vehicle engine; and
operating an air intake heater with the vehicle engine running to heat the combustion air entering the vehicle engine to increase a rate of heating of the coolant within the vehicle engine in order to more rapidly make heat available to a passenger compartment heating system of a vehicle in response to determining that the coolant temperature is below a first temperature threshold and the combustion air temperature is below a second temperature threshold.

12. The method according to claim 11, wherein
the operating of the air intake heater further includes ceasing operation of the air intake heater in response to determining the coolant temperature is above the first temperature threshold.

13. The method according to claim 11, wherein
the operating of the air intake heater further includes ceasing operation of the air intake heater in response to determining the air intake temperature is above the second temperature threshold.

14. The method according to claim 11, further includes
measuring temperature within the passenger compartment of the vehicle, and
the operating of the air intake heater further includes determining that the temperature within the passenger compartment measured by the passenger compartment temperature sensor is below a third threshold temperature.

15. The method according to claim 14, wherein
the operating of the air intake heater further includes preventing operation of the air intake heater in response to determining that the passenger compartment is above the third threshold temperature.

16. The method according to claim 11, further comprising
detecting an operational state of the vehicle heating system, where the heating system operates in a heat requested operating state and a no-heat requested operating state, and
the operating of the air intake heater further includes operating the intake heater in response to determining that the vehicle heating system is in the heat requested operating state.

17. The method according to claim 16, wherein
the operating of the air intake heater further includes ceasing operation of the air intake heater in response to determining that the vehicle heating system is in the no-heat requested operating state.

18. The method according to claim 16, wherein
detecting positions of a heater core door, the door being movable by passenger operated controls to move between a first position corresponding to the heat requested operating state such that the heater core door allows heating of air flowing to the passenger compartment and a second position corresponding to the no-heat requested operating state such that the heater core door prevents heating of air flowing to the passenger compartment.

19. The method according to claim 11, further comprising
measuring temperature of the passenger compartment,
detecting a temperature setting on a thermostatic device operable by a vehicle passenger, the operating of the air intake heater further including operating the air intake heater in response to determining that the temperature within the passenger compartment measured by the passenger compartment temperature sensor is below a temperature setting of the thermostatic device.

20. The method according to claim 19, wherein
the operating of the air intake heater includes ceasing operation of the air intake heater in response to determining that the temperature within the passenger compartment measured by the passenger compartment temperature sensor is at or above the temperature setting of the thermostatic device.

* * * * *